United States Patent
Hsiao et al.

(10) Patent No.: US 6,173,486 B1
(45) Date of Patent: Jan. 16, 2001

(54) THIN FILM MAGNETIC HEAD WITH SELF-ALIGNED POLE TIPS

(75) Inventors: Yun-Lin Hsiao, San Jose; Lien-Chang Wang, Fremont; Durga I. Ravipati, Saratoga; Hugh C. Hiner; William D. Jensen, both of Fremont, all of CA (US)

(73) Assignee: Read-Rite Corporation, Milpitas, CA (US)

( * ) Notice: Under 35 U.S.C. 154(b), the term of this patent shall be extended for 0 days.

(21) Appl. No.: 08/810,862

(22) Filed: Mar. 4, 1997

(51) Int. Cl.[7] .................................................. G11B 5/127
(52) U.S. Cl. ........................................................ 29/603.14
(58) Field of Search ................................ 29/603, 603.13, 29/603.14, 603.15, 603.16, 603.18

(56) References Cited

U.S. PATENT DOCUMENTS

| | | | |
|---|---|---|---|
| 4,550,356 | * 10/1985 | Hirai et al. | 29/603 |
| 4,947,541 | * 8/1990 | Toyoda et al. | 29/603 |
| 5,116,719 | * 5/1992 | Gau | 29/603 |
| 5,138,750 | * 8/1992 | Amin et al. | 29/603 |

* cited by examiner

Primary Examiner—David A. Scherbel
Assistant Examiner—Benjamin M. Halpern
(74) Attorney, Agent, or Firm—Nathan N. Kallman

(57) ABSTRACT

A magnetic head includes first and second pole tips separated by a nonmagnetic gap layer. The right side walls of the first and second pole tips are vertically aligned. Similarly, the left side walls of the first and second pole tips are vertically aligned. The side fringing flux is substantially reduced resulting in a magnetic head capable of writing data tracks with well defined boundaries. The fabrication of the magnetic head begins with forming a stack of layers on a substrate. The stack of layers includes a nonmagnetic layer sandwiched between the first pole tip layer and a sacrificial layer which is preferably made of a metal. A protective layer, such as alumina, is then deposited over and around the stack of layers. After planarization and ion milling, the sacrificial layer is exposed. The sacrificial layer is then etched away leaving a volume of space in the protective layer and above the gap layer. An inductive coil with associated dielectric layers are then deposited above the first pole layer. The second pole layer is thereafter deposited over the inductive coil and into the volume of space resulting in the first and second pole tips having vertically aligned side walls.

17 Claims, 7 Drawing Sheets

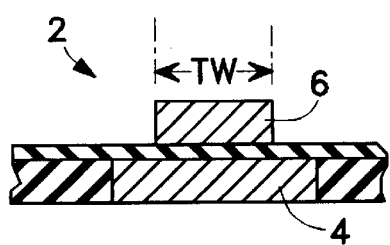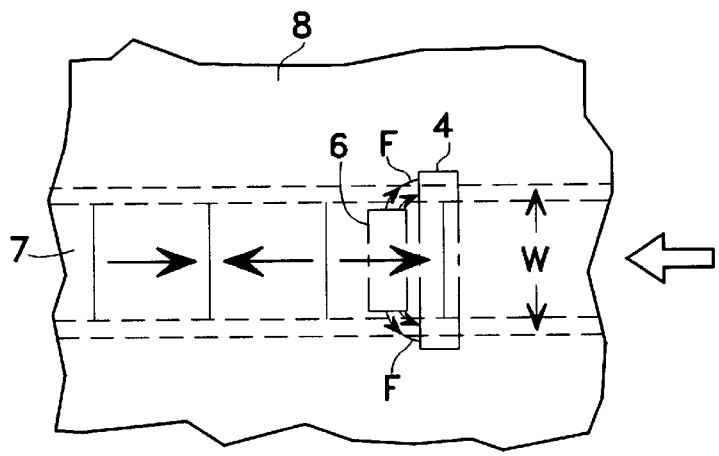
Fig. 1 (PRIOR ART)   Fig. 1A (PRIOR ART)
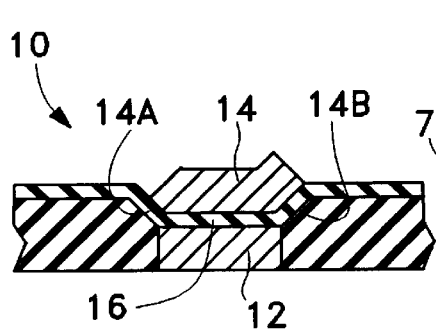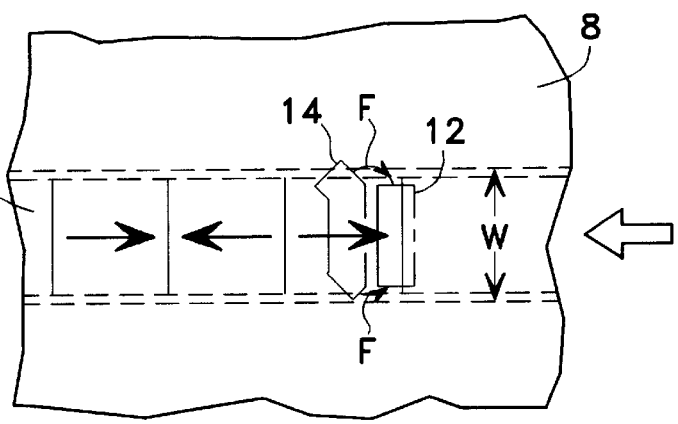
Fig. 2 (PRIOR ART)   Fig. 2A (PRIOR ART)
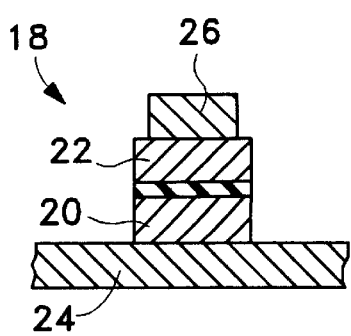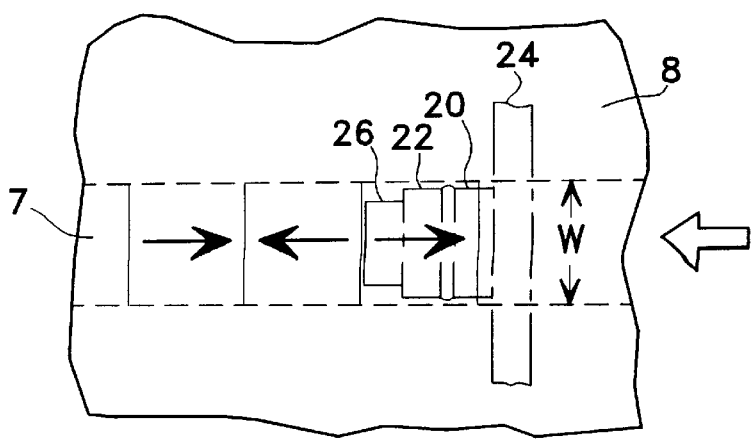
Fig. 3 (PRIOR ART)   Fig. 3A (PRIOR ART)

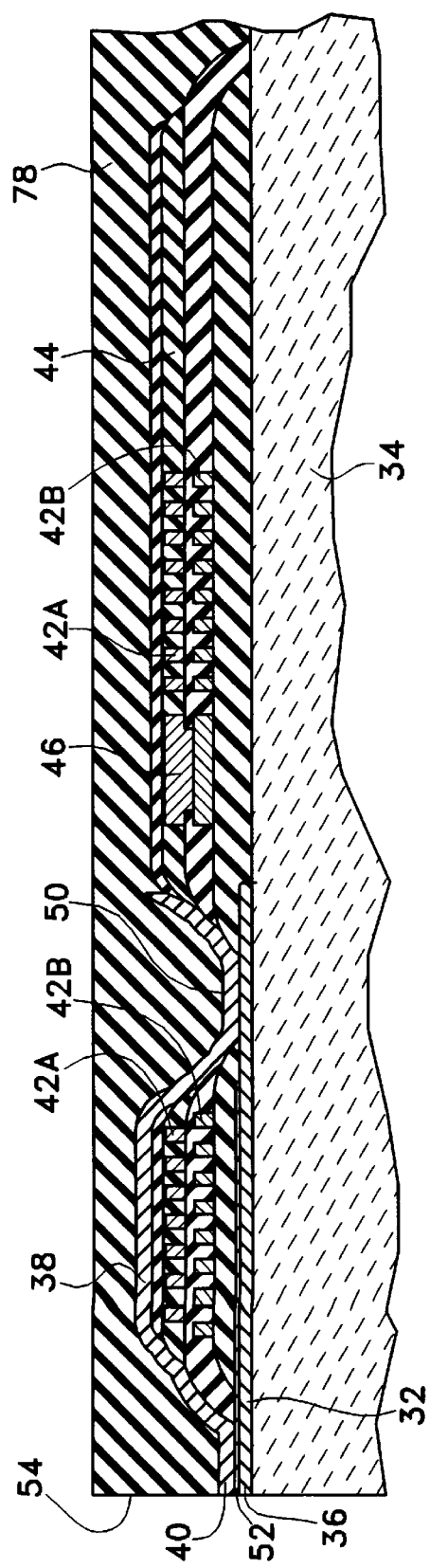

THIN FILM MAGNETIC HEAD WITH SELF-ALIGNED POLE TIPS

FIELD OF THE INVENTION

This invention relates to magnetic heads and in particular to methods of forming magnetic heads with narrow pole widths.

BACKGROUND OF THE INVENTION

A typical inductive thin film magnetic magnetic head comprises a first magnetic pole layer and a second magnetic pole layer with an electrical coil between the two pole layers. The two pole layers contact each other at one end at a back closure to form a continuous magnetic path, with a narrow transducing gap at the other end. The portions of the first and second poles separated by the transducing gap are designated respectively as the first and second pole tips. In order to write data with narrow track widths and high linear recording densities, it is necessary to provide a magnetic head with narrow pole tips. However, there are technical problems associated with fabricating a magnetic head with narrow pole tips. A key problem confronted during manufacture is the alignment of the two pole tips. Various methods have been suggested to solve this problem.

FIG. 1 shows a prior art approach in which a magnetic head 2 is fabricated with a first pole tip 4 wider in lateral dimension than a second pole tip 6. The wider first pole tip 4 tolerates a certain degree of misalignment during the laying of the second pole tip 6. The width of the second pole tip TW is intended to define the track width of the magnetic head 2. However, the problem with this approach is that due to the larger width of the first pole tip 4, magnetic flux fringing beyond the width of the second pole tip 6 is unavoidable. The fringing flux, such as flux lines F emanating from the second pole 6 to the first pole 4 as shown in FIG. 1A, would result in registering a data track 7 with a width W having ambiguous track boundaries. This seriously limits the track-to-track separations on the recording medium 8.

U.S. Pat. No. 4,947,541, Toyoda et al., entitled "Method For Producing a Thin Film Head", issued Aug. 14, 1990, describes a magnetic head with a sloped side wall for the second pole tip in an effort to reduce fringing flux lines. As shown in FIG. 2 herein, the magnetic head 10 includes a first pole 12 and a second pole 14 separated by a gap layer 16. The second pole 14 has sloped side wall surfaces 14A and 14B which diverge away from the first pole tip 12. The sloped side walls 14A and 14B reduce fringing flux between the first and second pole tips 12 and 14 as illustrated by the lower number of flux lines F as shown in FIG. 1B. Nevertheless, fringing flux still exists and the resultant track width W registered on the medium surface 8 remains ambiguous.

Magnetic heads with vertically aligned side wall pole tips have been described, as in U.S. Pat. No. 5,285,340, Ju et al., entitled "Thin Film Magnetic Head with Conformable Pole Tips", issued Feb. 8, 1994. FIG. 3 shows a magnetic head 18 having vertically aligned side walls for both the first and second pole tips 20, 22 relative to first and second yoke layers 24 and 26, respectively. With the aligned side walls for the first and second pole tips 20 and 22, the magnetic head 18 can provide better defined data track width W in comparison with the magnetic heads 2 and 10 shown in FIGS. 1 and 2. The aligned first and second pole tips 20 and 22 are made available through a number of intermediate "stitching" steps to the respective first and second yoke layers 24 and 26. Specifically, in between the pole tip layers 22 and 20, buffering layers must be interposed in order to maintain magnetic continuity. The intermediate steps incur additional costs of manufacturing.

Storage products, such as disk drives, are now fabricated with relatively small physical sizes and with increased storage capacities. As a consequence, data tracks on the media are registered with much narrower widths and higher linear recording densities. Data tracks written with ambiguous track boundaries seriously affect track-to-track separation, which in turn adversely affects storage capacity. Accordingly, it is desirable to provide magnetic heads capable of writing data tracks with well defined track boundaries, and at reasonable manufacturing costs.

SUMMARY OF THE INVENTION

It is an object of the invention to provide a magnetic head capable of writing narrow data tracks with high linear recording densities.

It is another object of the invention to provide a magnetic head that affords simplicity of fabrication and with reduced manufacturing cost.

In accordance with the invention, a magnetic head is formed with a stack of layers on a substrate. The stack of layers includes a nonmagnetic gap layer sandwiched between a first pole layer, which is disposed atop the substrate, and a sacrificial layer which is preferably made of a metal. A protective layer, such as alumina ($Al_2O_3$), is then deposited over and around the stack of layers. After planarization and ion milling, the sacrificial layer is exposed. The sacrificial layer is thereafter etched away leaving a volume of space in the protective layer and above the nonmagnetic gap layer. After the deposition of an inductive coil with the associated dielectric layers, a second pole layer is then laid with the pole tip deposited in the volume of space, resulting in the first and second pole tips having vertically aligned side walls. With the vertically aligned side walls, the side fringing flux of one pole tip to another is substantially reduced resulting in a magnetic head capable of writing data tracks with well defined boundaries during normal operations.

BRIEF DESCRIPTION OF THE DRAWINGS

The invention will be described in greater detail with reference to the drawings in which:

FIG. 1 is a cross-sectional front view of a prior art magnetic head having the first pole tip wider in lateral dimension than the second pole tip;

FIG. 1A schematically illustrates the effect of the side fringing flux on a registered data track written by the magnetic head shown in FIG. 1;

FIG. 2 is a cross-sectional front view of another prior art magnetic head having the second pole tip with diverged side walls for reducing side fringing flux;

FIG. 2A schematically illustrates the effect of the unavoidable side fringing flux on a registered data track written by the magnetic head shown in FIG. 2;

FIG. 3 is a cross-sectional front view of another prior art magnetic head having vertically aligned side walls of the first and second pole tips which are stitched onto the first and second pole layers, respectively;

FIG. 3A schematically illustrates the effect of the elimination of side fringing flux caused by the known magnetic head shown in FIG. 3;

FIG. 6 is a cross-sectional side view taken along the line 6—6 of FIG. 4; and

Like reference numerals refer to like parts.

DETAILED DESCRIPTION OF THE INVENTION

Figure 4:
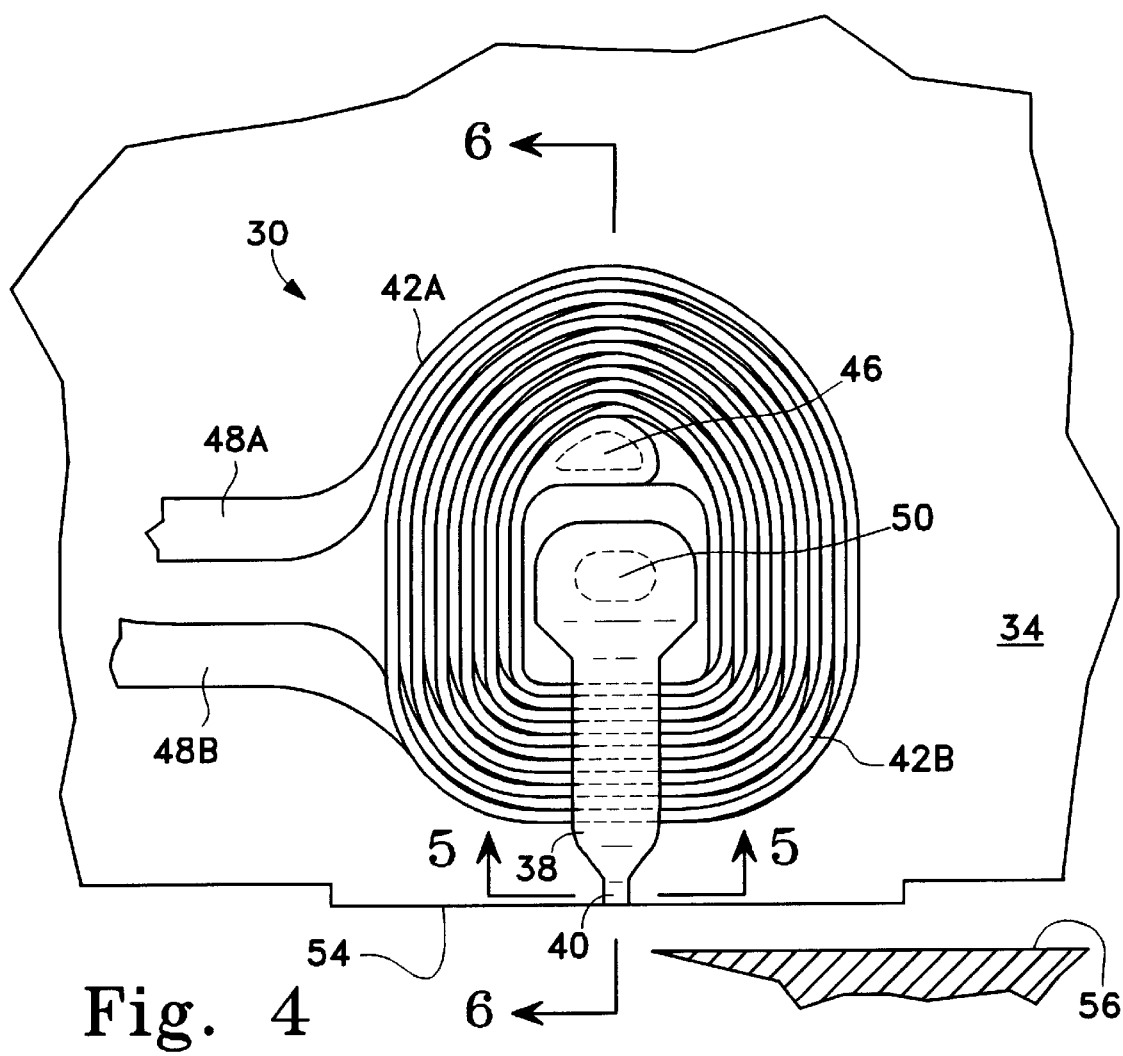
FIG. 4 is a top plan view of the magnetic head of the present invention.

FIG. 4 shows the top plan view of a magnetic head 30, made in accordance with this invention. For the sake of clarity, the top protective and insulating layers in FIG. 4 are not shown so that the relevant components of the magnetic head 30 can be exposed. However, the top layers are shown in FIGS. 5 and 6 which are cross-sectional front and side views taken along the lines 5—5 and 6—6, respectively, of FIG. 4.

Figure 5:
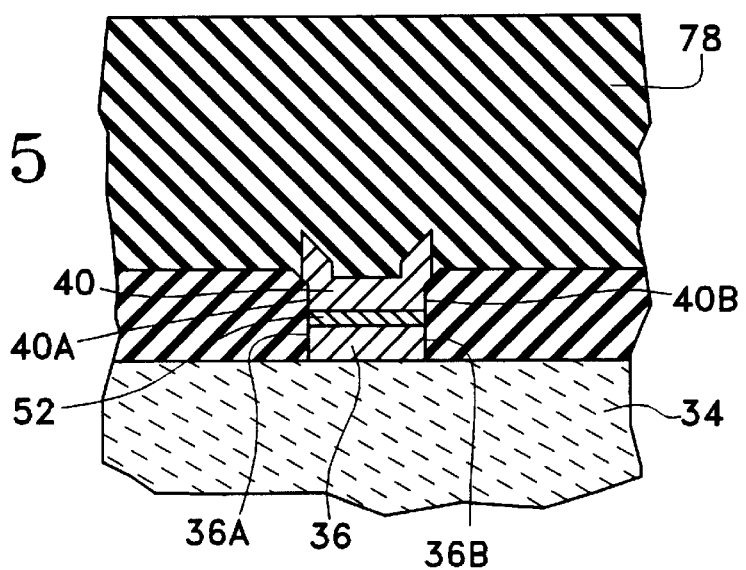
FIG. 5 is a cross-sectional front view taken along the line 5—5 of FIG. 4.

With reference to FIGS. 4–6, the magnetic head 30 includes a first pole layer 32 disposed on a substrate 34. Integral with the first pole layer 32 is a first pole tip 36. The substrate 34 can be made of a nonmagnetic and electrically insulating material, such as alumina titanium carbide ($Al_2O_3$/TiC) or silicon carbide (SiC). Alternatively, the substrate 34 can be prefabricated with layers of different components. For example, in a merged head, various component layers for the read head may be fabricated in advance and thereafter serve as a substrate for the first pole layer 32. Above the first pole layer 32 is a second pole layer 38 having an integral pole tip 40. In this embodiment, sandwiched between the first and second pole layers 32 and 38 is a pair of inductive coils 42A and 42B separated by dielectric material 44. The coils 42A and 42B are electrically connected to each other by an electrical feedthrough 46. Electrical current can be directed to and from the serially connected coils 42A and 42B via a pair of electrical leads 48A and 48B.

The first and second pole layers 32 and 38 are in direct contact at a back closure region 50 to form a continuous magnetic path. The layers 32 and 38 have a transducing gap 52 between the pole tips 36 and 40. The magnetic head 30 of the invention comprises vertically aligned side walls for the first and second pole tips 36 and 40 as shown in FIG. 5. Specifically, the left side wall 36A of the first pole tip 36 is in vertical alignment with the left side wall 40A of the second pole tip 40. Similarly, the right side wall 36B of the first pole tip 36 is flush with the right side wall 40B of the second pole tip 40. The aligned side walls 36A to 40A, and 36B to 40B substantially reduce fringing flux from one pole to another, thereby enabling the magnetic head 30 to write data with well defined data tracks on the magnetic medium 56.

FIGS. 7A–7M are sequential drawings schematically illustrating the fabrication process of the magnetic head 30 of the invention.

Figure 7A:
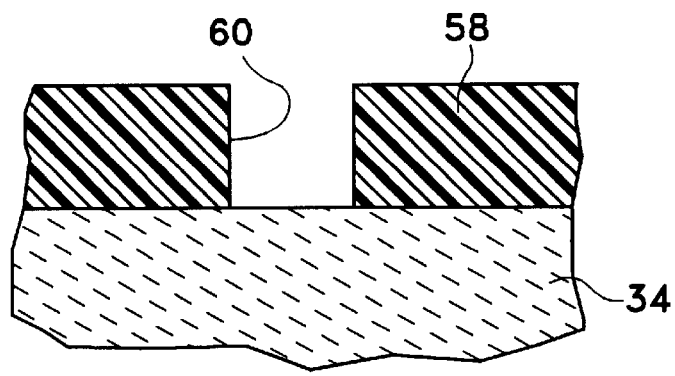
FIGS. 7A–7N are sequential views schematically illustrating the process of forming the magnetic head of the invention shown in FIGS. 4–6.

First a substrate 34 is provided. The substrate 34 can be with or without prefabricated components. A photoresist layer 58 is then spun atop the surface of the substrate 34. By means of photolithography, the photoresist layer 58 is patterned for forming an opening 60 in the layer 58. It should be noted that a seed layer (not shown) to facilitate the following processes of electroplating is formed at the bottom of the opening 60 prior to the deposition of the photoresist layer 58. The resultant structure up to this step is shown in FIG. 7A.

Figure 7B:
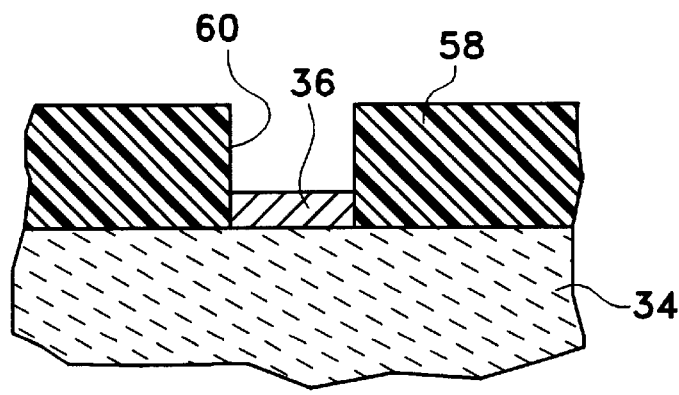

The opening 60 is then electroplated with a first pole layer 32 (shown in FIG. 6) including a first pole tip 36 to a thickness of approximately $1\mu$ (micrometer). The material for the first pole layer 32 with the pole tip 36 is preferably made of a material having a high permeability and a low coercive force. An example of such a material is Permalloy, a nickel-iron alloy (NiFe). As an alternative, a cobalt and indium based alloy with high magnetic moment, such as CoIn can also be used. The resultant structure up to this step is shown in FIG. 7B.

Figure 7C:
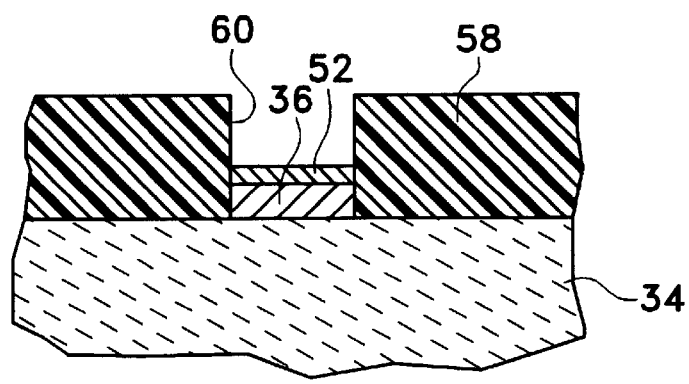

A gap layer 52 is then electroplated onto the first pole layer 32 with the pole tip 36 as shown in FIG. 7C. In the preferred method, the thickness for the gap layer 52 is between $0.1\mu$ to $0.4\mu$. The material for the gap layer 52 is preferably made of a non-magnetic metal, such as chromium (Cr), aluminum (Al), platinum (Pt), molybdenum (Mo) or copper (Cu).

Figure 7D:
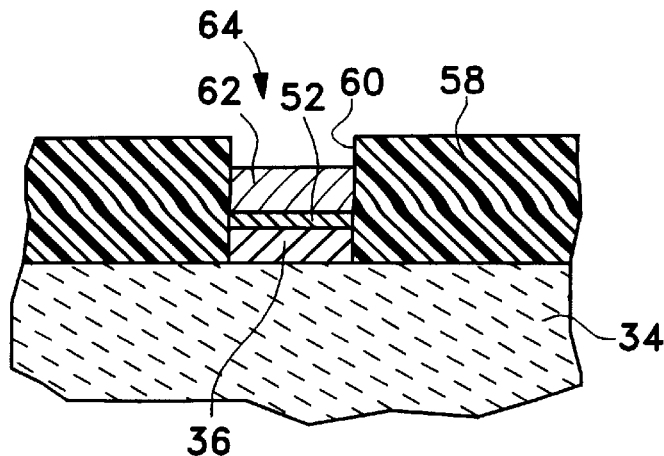

Thereafter, a sacrificial layer 62 is electroplated onto the gap layer 52 to a thickness of approximately $1.5\mu$ to $2.0\mu$. The material for the sacrificial layer 62 is preferably a metal which is easily etchable. Suitable materials for the sacrificial layer 62 include copper (Cu) and aluminum (Al). The resultant structure up to this step is as shown in FIG. 7D. In essence, a stack of layers 64, which includes the first pole tip layer 36, the gap layer 52 and the sacrificial layer 62, is formed inside the opening 60.

Figure 7E:
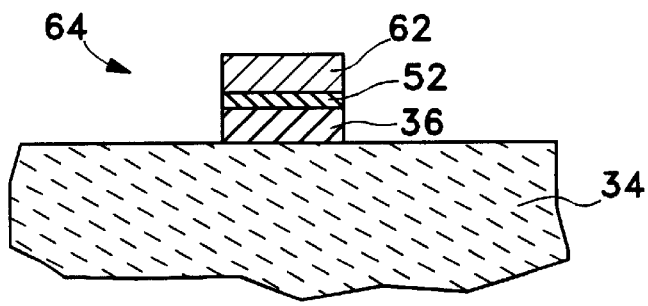
Figure 7F:
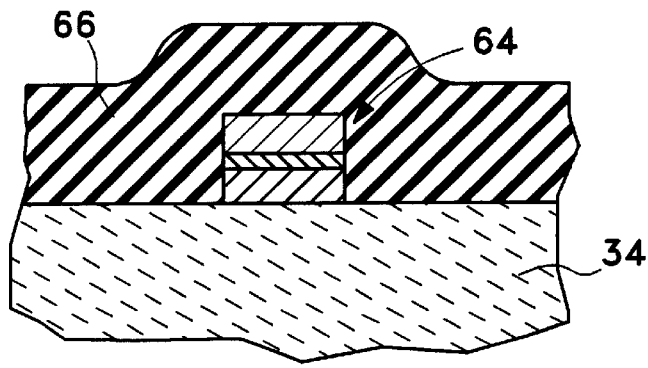

What follows is the removal of the photoresist layer 58 by a photoresist solvent via the conventional photolithography process which results in the stack of layers 64 adhering to the substrate 34. The resultant structure up to this step is shown in FIG. 7E.

Through the process of sputtering or chemical vapor deposition (CVD), a protective layer 66 is deposited onto the substrate 34 over the stack of layers 64. In the preferred method, the CVD method is used and the protective layer 66 is deposited over and around the stack of layers 64 to a thickness of approximately $3\mu$ to $4\mu$.

Figure 7G:
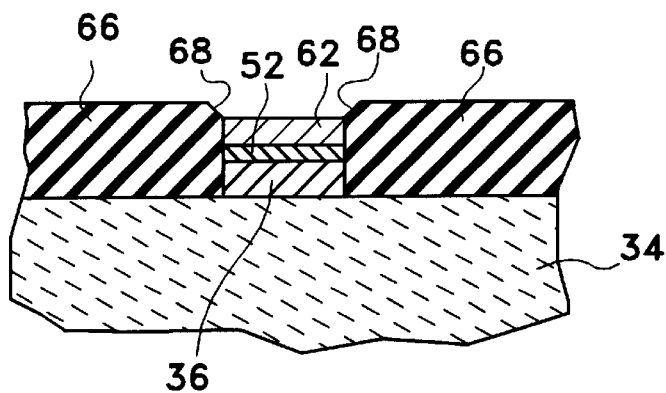

The structure is then subjected to a two-step leveling process in which the protective layer 66 is planarized via mechanical lapping with the assistance of a slurry which may include alumina ($Al_2O_3$) or silicon dioxide ($SiO_2$), for example. Thereafter, the process of ion milling is employed. Since the protective layer 66 is usually more resistant to ion milling than the sacrificial layer 62, the latter is milled faster than the former. In addition, bevels 68 are formed at the boundaries of the protective layer 66 interfacing with the sacrificial layer 62 as shown in FIG. 7G. The bevels 68 are preferably formed by ion milling at an angle between 10° to 50° with respect to the normal of the substrate surface. The bevels 68 provide an alignment tolerance for the subsequent photolithography process.

Figure 7H:
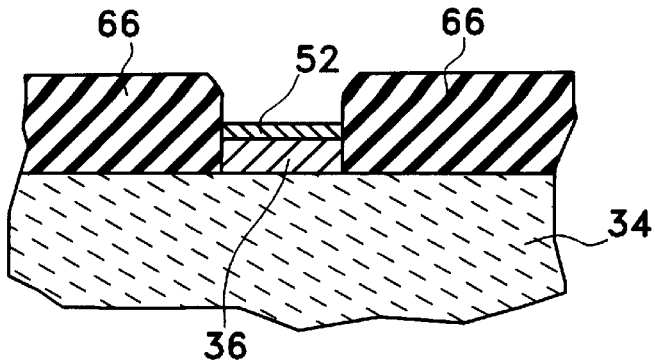
Figure 7I:
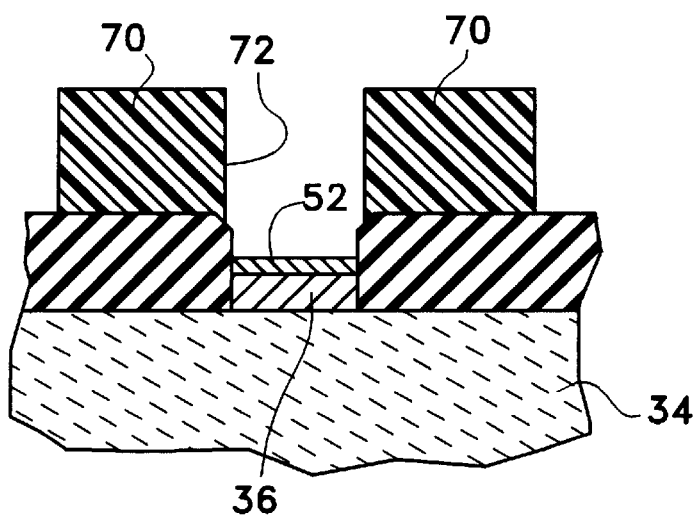

The sacrificial layer 62 is then etched away using an etchant which attacks the sacrificial layer faster than other layers. If the sacrificial layer 62 is made of copper, the etchant can be nitric acid ($HNO_3$). If the sacrificial layer 62 is formed of aluminum, ammonia persulphate ($2NH_4S_2O_6$) can be used as etchant. The conventional steps of depositing the inductive coils 42A and 42B and the associated intermediate dielectric layers 44 then follow. The resultant structure up to this step is shown in FIG. 7H, in which the coil layer 42A and 42B and the dielectric layer 44 are not shown but can been seen in FIGS. 4 and 6.

The second pole layer 38 (see FIG. 6) which includes the second pole tip 40 is then formed over the gap layer 52. First, the lateral dimension of the upper portion of the pole tip 40 is defined by patterning another photoresist layer 70 with an opening 72. The second pole layer 38 with the pole tip 40 is then sputtered into the opening 72. The resultant structure up to this step is shown in FIG. 7J.

Figure 7J:
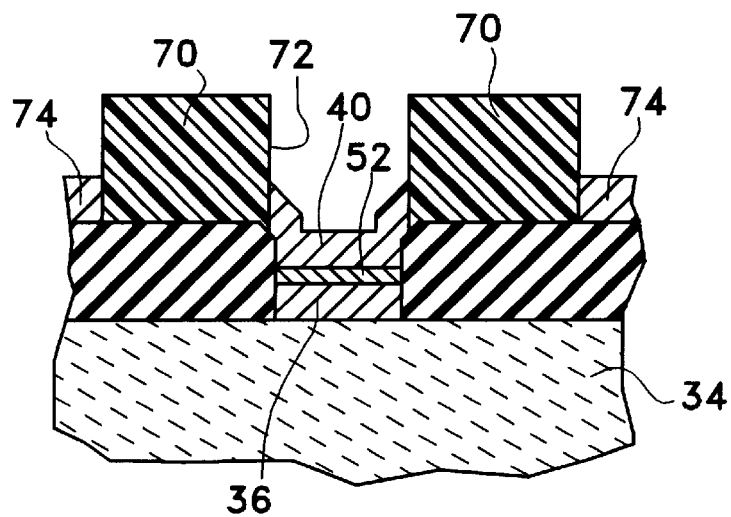
Figure 7K:
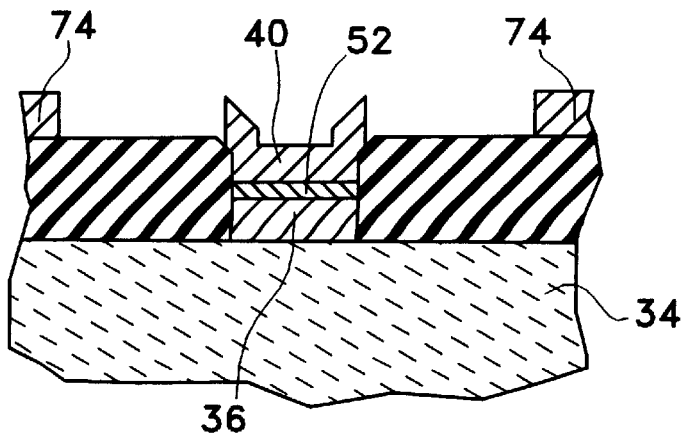
Figure 7L:
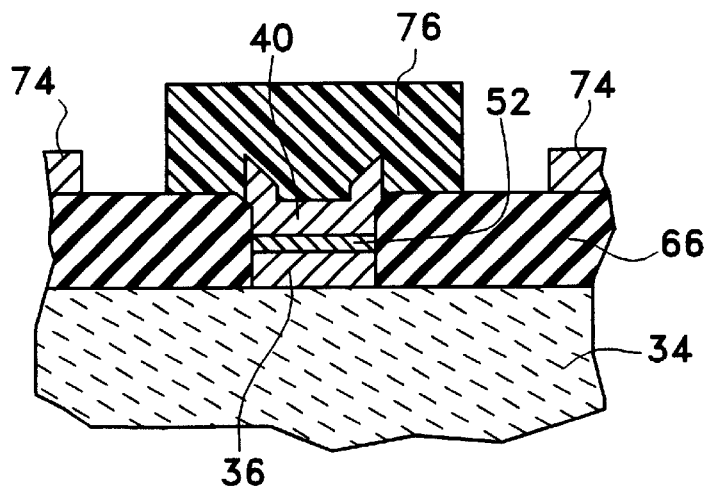
Figure 7M:
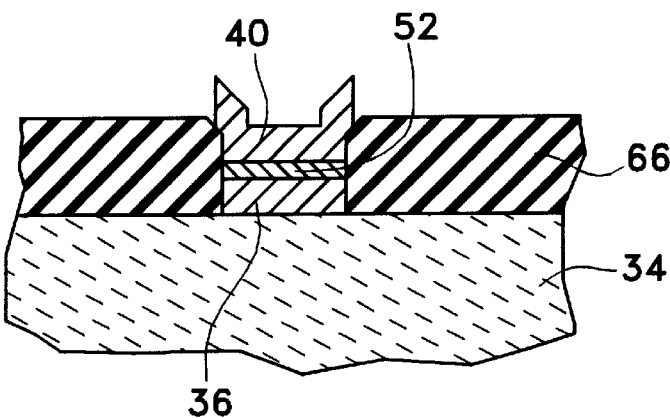

The remaining pole layer 74 shown in FIGS. 7J and 7K needs to be removed. First, the photoresist layer 70 is removed by a photoresist solvent. A third photoresist layer 76 is then patterned on the top of the second pole tip 40 (see FIG. 7L). The remanent layer 74 can thereafter be removed by wet etching or ion milling, for example. The resultant structure up to this step is shown in FIG. 7M.

Figure 7N:
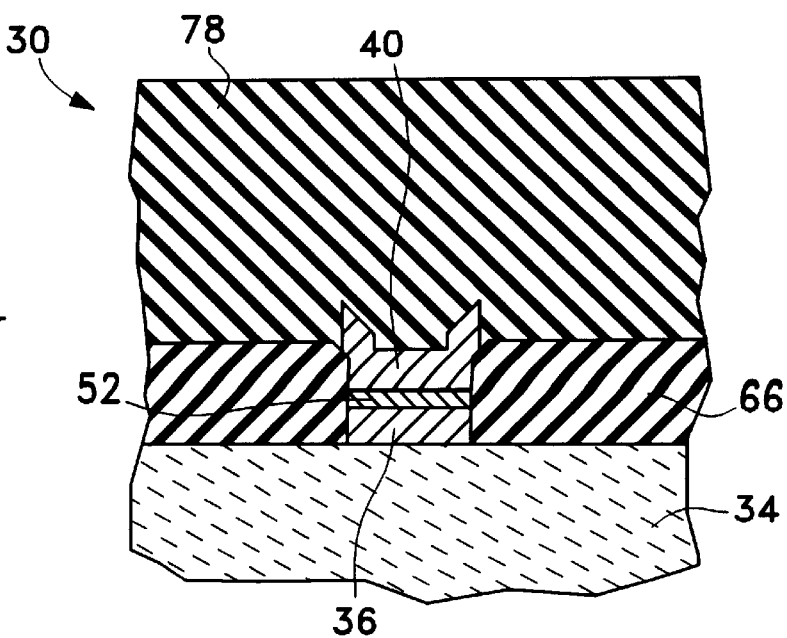

Finally, an overcoat layer 78 is deposited on the top of the second pole layer 38 with the pole tip 40 and the protective layer 66. The protective layer 66 may be formed of alumina, $SiO_2$, $Si_3N_4$ or other dielectric materials. IThe resultant magnetic head 30 is shown in cross-section in FIG. 7N.

It should be noted that for the inventive process as described above, there is no need for the first and second pole tips 36 and 40 to be "stitched" onto the respective first and second pole layers 32 and 38. Instead, the first pole tip 36 and the first pole layer 32 are deposited as one integral layer. Likewise, the second pole tip 40 and the second pole layer 38 are deposited as another integral layer. The intermediate steps of stitching are thereby eliminated.

By virtue of this invention, thin film magnetic heads with self-aligned pole tips can be fabricated to interact with magnetic media capable of recording data signals with high areal densities.

What is claimed is:

1. A method of forming a magnetic head on a substrate, comprising the steps of:
   forming a stack of layers on said substrate, said stack of layers including a first pole layer and a sacrificial layer disposed above said first pole layer;
   depositing a protective layer over and around said stack of layers;
   leveling said protective layer such that said sacrificial layer in said stack of layers is exposed;
   removing said sacrificial layer thereby leaving a volume of space above said first pole layer;
   forming a second pole layer in said volume of space;
   wherein said step of forming a stack of layers includes the step of depositing a transducing gap layer above said first pole layer prior to forming said sacrificial layer; and
   wherein said gap layer is formed of a nonmagnetic metal.

2. The method of forming a magnetic head as set forth in claim 1 wherein the step of leveling said protective layer includes the steps of:
   mechanically lapping said protective layer; and
   ion milling said protective layer and said sacrificial layer such that said sacrificial layer in said stack of layers is exposed.

3. The method of forming a magnetic head as set forth in claim 1 wherein the step of removing said sacrificial layer includes etching said sacrificial layer using an etchant which substantially attacks said sacrificial layer faster than other layers.

4. The method of forming a magnetic head as set forth in claim 1 wherein forming a second pole layer includes the steps of planarizing and ion milling said protective layer for exposing said sacrificial layer and subsequently chemical etching said sacrificial layer for removing said sacrificial layer.

5. The method of forming a magnetic head as set forth in claim 1 wherein said sacrificial layer is made from elements of copper and aluminum.

6. The method of forming a magnetic head as set forth in claim 5 wherein said protective layer comprises a dielectric material, such as alumina, $SiO_2$, $Si_3N_4$, and said first and second pole layers comprise a nickel-iron alloy or an iron based high moment alloy.

7. The method of forming a magnetic head as set forth in claim 1 wherein said sacrificial layer includes copper, said protective layer comprises alumina and said first and second pole layers comprise a nickel-iron alloy.

8. The method of forming a magnetic head as set forth in claim 1 wherein said sacrificial layer comprises copper, said protective layer comprises silicon dioxide and said first and second pole layers comprise a cobalt and indium based alloy.

9. The method of forming a magnetic head as set forth in claim 1 wherein the step of forming a stack of layers comprises the steps of:
   depositing a photoresist layer over said substrate;
   patterning said photoresist layer by forming an opening in said photoresist layer;
   depositing said first pole layer over said substrate through said opening:
      depositing a nonmagnetic metal gap layer over said first pole layer through said opening;
      depositing said sacrificial layer over said gap layers through said opening; and
      removing said photoresist layer.

10. The method of forming a magnetic head as set forth in claim 1 including the step of depositing a coil layer dielectrically insulated from said first pole and gap layers prior to forming said second pole layer.

11. A method of forming a magnetic head on a substrate comprising the steps of:
    depositing a first material layer over said substrate;
    forming an opening in said first material layer;
    depositing a first pole layer, a nonmagnetic metal gap layer and a sacrificial layer in said opening;
    removing said first material layer;
    depositing a second material layer over and around said first pole layer and said sacrificial layer;
    mechanical lapping said second material layer such that said sacrificial layer is exposed;
    ion milling said sacrificial layer at an angle of between 10°–50° for creating a bevel edge;
    removing said sacrificial layer thereby leaving a volume of space above said gap layer in said second material layer;
    depositing a second pole layer in said volume of space; and
    patterning said second pole layer by selectively removing material in said second pole layer.

12. The method of forming a magnetic head as set forth in claim 11 therein the step of leveling said second material layer includes the steps of:
    mechanically lapping said protective layer; and
    milling said protective layer and said sacrificial layer with an ion beam which attacks said sacrificial layer faster than said protective layer such that bevels are formed on the boundaries of said protective layer interfacing with said sacrificial layer.

13. The method of forming a magnetic head as set forth in claim 12 wherein the step of removing said sacrificial layer includes etching said sacrificial layer using an etchant which substantially attacks said sacrificial layer faster than other layers.

14. The method of forming a magnetic head as set forth in claim 13 including the step of depositing a coil layer dielectrically insulated from said first pole and gap layers prior to depositing said second pole layer.

15. The method of forming a magnetic head as set forth in claim 14 wherein said first material layer is a photoresist layer and said second material layer comprises a dielectric material.

16. The method of claim 15, wherein said dielectric material is $Al_2O_3$, $SiO_2$ or $Si_3N_4$.

17. The method of forming a magnetic head as set forth in claim 16 wherein said first and second pole layers include a nickel-iron alloy, and said transducing gap layer includes a nonmagnetic metal.

* * * * *